UNITED STATES PATENT OFFICE.

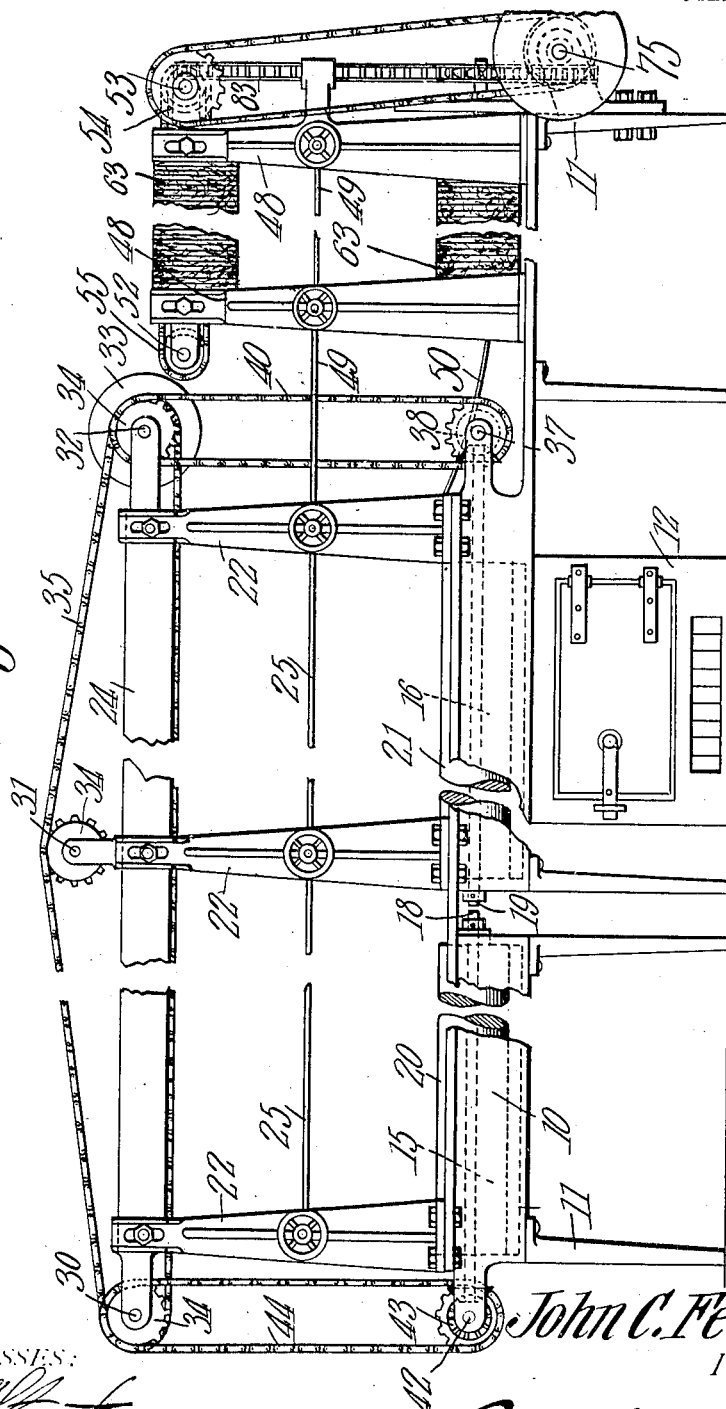

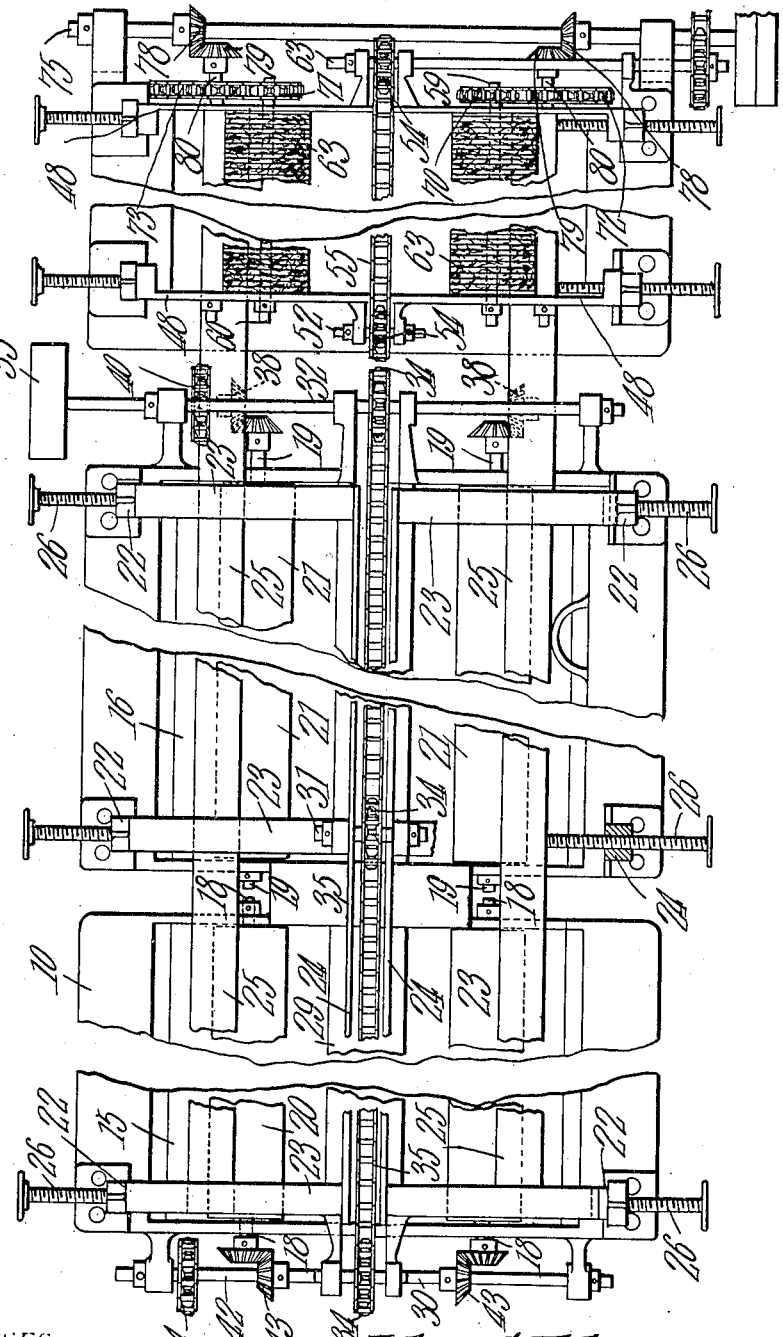

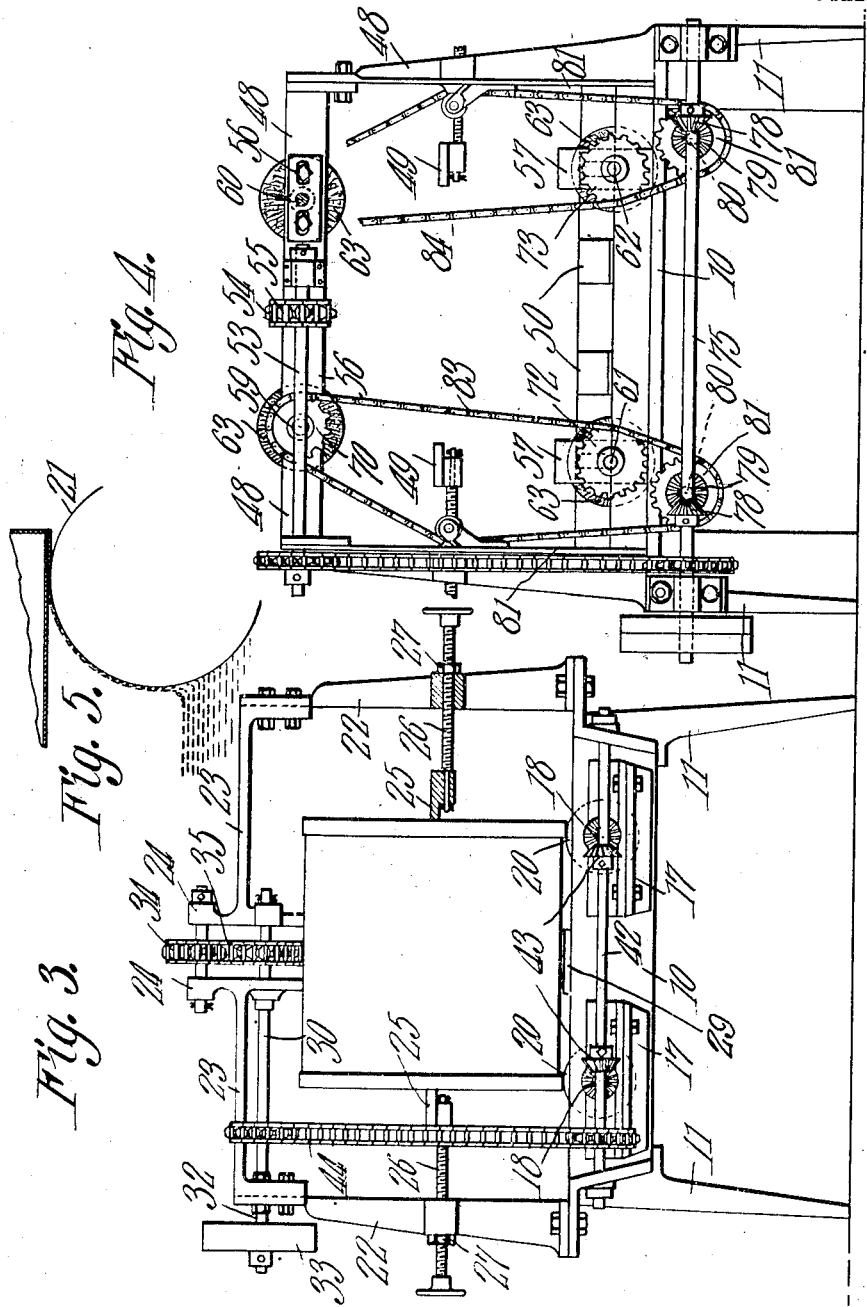

JOHN C. FETZER, OF HOOPESTON, ILLINOIS.

CAN-SOLDERING MACHINE.

No. 904,192.

Specification of Letters Patent.

Patented Nov. 17, 1908.

Application filed May 17, 1907. Serial No. 374,182.

*To all whom it may concern:*

Be it known that I, JOHN C. FETZER, a citizen of the United States, residing at Hoopeston, in the county of Vermilion and State of Illinois, have invented a new and useful Can-Soldering Machine, of which the following is a specification.

This invention relates to can soldering machines, and has for its principal object to provide a machine, whereby both heads of a can may be simultaneously soldered to the body during a single passage of the can through the machine.

A further object of the invention is to provide a can soldering machine in which the solder is applied by movable members, as distinguished from the familiar type of can soldering machines, wherein the cans are dipped.
A still further object of the invention is to provide a machine in which the cans are traveled continuously through the machine, and during their transit are supplied with a suitable flux, such as muriatic acid or the like, and then a quantity of solder, after which the cans pass through wipers which remove the surplus solder and form a smooth joint.

A still further object of the invention is to provide a device of this class in which a solder is applied by means of rollers that dip into a bath of molten solder and carry a thin film of the same up to the joint in such direction that there is a tendency to force the solder under the flange of the can head or bottom.

A still further object of the invention is to provide a mechanism of this class that may be readily adjusted for operation on cans of different size.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a side elevation of a can soldering machine constructed in accordance with the invention. Fig. 2 is a plan view of the same. Fig. 3 is an end elevation of the machine looking from the left of Fig. 1, one of the cam guides being shown in section. Fig. 4 is a similar view looking from the opposite end of the machine. Fig. 5 is a detail view on an enlarged scale showing the manner in which the film of solder is carried to the soldering point.

Similar numerals of reference are employed to indicate corresponding parts throughout the several figures of the drawings.

The machine is mounted on a suitable supporting table 10 that is provided at each end with lugs or standards 11 and at about the center of the machine the table is supported by the top walls of a furnace 12, over which the solder trough is located, the furnace being of any suitable construction and arranged to burn coal, wood, oil, gas or any other fuel for the purpose of keeping the solder in a molten state.

Arranged side by side on the table is a flux containing trough 15, and a solder trough 16, and these may be provided with any suitable automatic mechanisms for maintaining the level of the contents, such, for instance, as floats, automatic valves, or the like.

The ends of the troughs are provided with bearing blocks 17 arranged in pairs, those of each pair being adjustable toward and from each other, and in these bearing blocks are mounted shafts 18, 19, the shafts 18 carrying flux applying rollers 20, and the shafts 19 carrying solder applying rollers 21. The can to be soldered travels on these rollers, moving in the direction of the length of the rollers, and the adjustable bearings permit of the use of the apparatus in connection with cans of different size.

Supported by the trough sides or frame are pairs of uprights 22, having inwardly extending arms 23, which are connected together by a pair of longitudinal bars 24. These bars form guards that hold the can down in contact with the rolls.

The uprights 22 form supports for side guards 25 which engage with the can tops and bottoms for the purpose of holding the latter in place, and at the same time prevent endwise displacement of the cans. These guards 25 are carried by bolts 26 that project through openings in the uprights or standards, the bolts having suitable nuts 27, whereby they may be held in place. As a further precaution the troughs carry plates or bars 29 that are disposed between the rollers of each pair in order to prevent dropping of the can into the flux or solder in case the can is fed in endwise.

In the upper portions of the uprights or standards are arranged bearings for the reception of three shafts 30, 31 and 32, the shaft 32 carrying a clutch pulley 33 which may be driven from any suitable source of power, and the three shafts are provided with sprocket wheels 34 over which passes a link belt 35, the lower run of the belt passing between the upper guard bars 24 and coming into contact with the tops of the cans. This feed belt moves the cans from end to end of the flux and solder troughs, and at the same time causes the cans to revolve. The weight of the chain is in itself sufficient to hold the cans down in contact with the flux and solder applying rollers, so that the upper guards 24 are not absolutely essential.

At one end of the solder trough is a horizontally disposed shaft 37 carrying a pair of bevel gears 38 which intermesh with corresponding bevel gears on the ends of the shafts 19, these bevel gears 38 being adjustable in the direction of the length of the shaft 37, in order to accommodate adjustment of the solder applying rollers 21. The shaft 37 is connected to the driving shaft 32 by a suitable belt 40 and belt wheels or pulleys.

At the front or feed end of the machine is a transversely disposed shaft 42 carrying bevel gears 43 adjustable lengthwise of the shaft and intermeshing with corresponding bevel gears of the shafts of the flux applying rollers. This shaft 42 is connected to the shaft 30 by a belt 44 and suitable belt wheels.

In the operation of the mechanism as thus far described, the cans are fed in at the end of the flux trough and are caught by the chain 35 and revolve on the rollers 20 and 21 as they pass through the machine. The flux applying rollers are rotated in opposite directions, respectively, that is to say, they rotate toward the ends of the can, so that the film of flux carried upward will, to some extent, be forced under the flanges of the tops and bottoms of the cans. The rollers rotate at sufficient speed to apply the necessary flux, and such rollers are of sufficient length to insure at least one complete rotation of the can as it travels through the machine. The can then reaches the solder applying rolls, where the operation is repeated, these rollers moving in the same direction as the flux rollers, and tending to force the films of solder into the flanges of the tops and bottoms. It is to be understood that this method of applying the flux and the solder, or either of them, may be advantageously used where the top or the bottom alone is being soldered, or in the uniting of other pieces of metal, especially where it is desired to force the flux or solder under a flange. In order to complete the can, the latter is then fed to a wiping device, where the surplus solder is removed and the solder still in a comparatively soft or semi-molten condition, is brushed in to the seam or flange.

Beyond the end of the solder trough is a pair of rectangular frames 48, that are provided with adjustable side guards 49 and bottom supports 50 of the can. These frames further carry two shafts 52 and 53, having pulleys 54 connected by a feed belt 55 that is arranged to engage with the top of the can and rotate the same while feeding it forward. This frame is provided with a pair of upper bearings 56 adjustable from and toward each other, and a pair of lower bearings 57 that are adjustable vertically. These several bearings carry shafts 59, 60, 61, 62, and on all of the shafts are wiper rolls 63, said rolls being preferably formed of a plurality of disks of felt, leather, or textile material, or of any other material which will tend to wipe the solder from the surface of the can and force the semi-molten solder into the flange or seam, and by means of the adjustable bearings these wiper rolls may be made to accommodate cans of varying size. The shafts, respectively, carry sprocket wheels 70, 71, 72 and 73.

At the rear end of the machine is a driven shaft 75 carrying fast and loose pulleys, this shaft being belted to the upper shaft 53 which drives the feed belt 55. The shaft 75 carries bevel gears 78 which intermesh with bevel gears 79 on short shafts 80 that are provided with sprocket wheels 81. One of the sprocket wheels 81 is connected to the sprocket wheels 70 and 72 by a link belt 83, while the other sprocket wheel 81 is connected to the sprocket wheels 71 and 73 by a link belt 84, the sprocket wheels being of uniform diameter so that the several rollers may be driven at the same speed.

I claim:—

1. A can soldering machine comprising a solder trough, a pair of solder applying rolls dipping thereinto, a pair of guards carried by the frame and engaging the ends of the can, a pair of upper guards for engagement with the sides of the can, means for feeding the can, and a protecting strip arranged below the level of the rolls and disposed between the rolls.

2. In a machine of the class described, a frame, a flux containing trough, and a solder containing trough carried thereby, a pair of flux supplying rollers dipping into the flux trough, a pair of solder applying rollers dipping into the solder trough, guards for engagement with the ends and upper portions of the cans, a drag chain for revolving the cans and feeding the same across the flux rolls, then across the solder rolls, a plurality of wiper rolls, means for feeding the can through the wiper rolls after passing from the solder rolls, and means for operating said rolls.

3. In a soldering machine the combination with oppositely disposed flux-applying rolls, solder-applying rolls alining therewith, means for supplying fluids to said rolls, and wiping rolls; of parallel side guards extending continuously above all of said rolls, means for adjusting said guards relative to each other, longitudinal holding bars supported above the side guards for holding cans upon the rolls, endless means disposed between said bars for dragging cans longitudinally of the rolls, and means for simultaneously rotating the rolls of each set upwardly and outwardly relative to the ends of the cans.

In testimony that I claim the foregoing as my own, I have hereto affixed my signature in the presence of two witnesses.

JOHN C. FETZER.

Witnesses:
WILLIAM B. SAINDON,
GEORGE P. RANSOM.